United States Patent
Reddy et al.

(10) Patent No.: US 10,904,987 B1
(45) Date of Patent: Jan. 26, 2021

(54) SYSTEMS AND METHODS FOR OPERATING LIGHTS

(71) Applicant: Light Power Technologies, LLC, Pompano Beach, FL (US)

(72) Inventors: Rakesh Reddy, Boca Raton, FL (US); Kevin Doyle, Pompano Beach, FL (US)

(73) Assignee: Light Power Technologies, LLC, Pompano Beach, FL (US)

( * ) Notice: Subject to any disclaimer, the term of this patent is extended or adjusted under 35 U.S.C. 154(b) by 0 days.

(21) Appl. No.: 17/013,549

(22) Filed: Sep. 5, 2020

(51) Int. Cl.
*H05B 47/17* (2020.01)
*H05B 47/16* (2020.01)

(52) U.S. Cl.
CPC ............. *H05B 47/17* (2020.01); *H05B 47/16* (2020.01)

(58) Field of Classification Search
CPC .. H05B 37/02; H05B 37/0227; H05B 37/027; H05B 33/08; H05B 33/0815; H05B 33/0845; H05B 33/0863; H05B 33/089; H05B 47/10; H05B 47/105; H05B 47/16; H05B 47/17; H05B 47/185; H05B 47/19; H05B 45/10; H05B 45/20
See application file for complete search history.

(56) References Cited

U.S. PATENT DOCUMENTS

| | | | |
|---|---|---|---|
| 9,658,256 B2 | 5/2017 | Nicholson | |
| 9,955,547 B2 | 4/2018 | Taipale | |
| 10,057,964 B2* | 8/2018 | Raposo | H05B 45/10 |
| 10,299,342 B1* | 5/2019 | Reddy | H05B 45/50 |
| 2011/0187275 A1* | 8/2011 | Giltaca | H05B 47/185 |
| | | | 315/159 |
| 2013/0215394 A1 | 8/2013 | Reddy | |
| 2013/0249429 A1* | 9/2013 | Woytowitz | H05B 47/185 |
| | | | 315/246 |
| 2014/0210373 A1* | 7/2014 | Baret | H05B 47/185 |
| | | | 315/294 |

FOREIGN PATENT DOCUMENTS

CN 109743816 A 5/2019

\* cited by examiner

*Primary Examiner* — Thai Pham
(74) *Attorney, Agent, or Firm* — Clayton, McKay & Bailey, PC

(57) ABSTRACT

Systems and methods for operating lights can include stepping down a high voltage power supply and transmitting a resulting low voltage through a relay to a light. A device controller system can receive a selected mode for operating the light including a setting for brightness, color, or operation scheme. The selected mode can be converted into a command configured to cause the light to operate continuously while changing from a current mode of operation to the selected mode. The system can determine an operation sequence for the relay to convey the command to the light. A schedule for the operation sequence can include a zero cross operation by the relay indicating, to the light, the setting or an operation mode change. The relay can operate according to the operation sequence and the schedule and the light can change to from the current mode to the selected mode without delay.

20 Claims, 10 Drawing Sheets

SYSTEMS AND METHODS FOR OPERATING LIGHTS

BACKGROUND

Colored lighting is becoming very popular in many industries (e.g., food service, entertainment, hotel, special events, etc.) with the advent of various light emitting diode ("LED") technologies, as well as other light or illuminating technologies. Many of these types of lights can change the color of light they display, as well function to create different lighting shows (e.g., synchronized displays of light, synchronized changing of colors, various sequences of both). As new lighting technologies have been developed, colored lights and lighting systems for pools have become ubiquitous. The pool and spa construction industry increasingly employs these different types of light technologies as pool lights to provide dynamic pool user experiences and versatile entertainment, therapy, and/or revenue generating options for pool owners.

Many lights employed in pool lighting systems are capable of performing various pre-determined operation schemes (often referred to as "light shows" or "shows"). These operation schemes can include sequences of changes in color, brightness, and light emission patterns respectively assigned to and executed by different lights in a pool system. Each operation scheme may create a unique choreographed display of light that can be selected by a user. Many of these lights use power interruption as a means of selecting and changing an operation scheme that lights are controlled to perform. In this method, power to each light in a system of lights may have to be interrupted a variable (n) number of times for an operation scheme to be selected from a library of operations schemes for the lights.

For example, a light incorporated in a pool system may have seven operation schemes per a manufacturer. In an instance where the light is being controlled to perform a fourth operation scheme ("scheme no. 4") of a respective library of seven schemes, the power to the light is in an ON state. Interrupting power according the sequence of OFF-ON-OFF-ON-OFF-ON-OFF-ON-off-ON (five power cycles) will switch an operation scheme for the light five times. More specifically, the light will switch: from scheme no. 4 to no. 5; from scheme no. 5 to no. 6; from scheme no. 6 to no. 7; from scheme no. 7 to no. 1; and from scheme no. 1 to no. 2.

There is a delay associated with performing a series of power cycles. Typical lights incorporated in pool systems may have around 15 or 16 operation schemes in their scheme libraries. Thus, getting a light into a 16th operation scheme will require 16 ON-OFF-ON cycles of the light that was performing operation scheme no. 1 before last time it was turned off not for the purposes of changing operations schemes. Accordingly, a delay between scheme performance could be appreciable. Further, while a series of power cycles are being performed (e.g., manually by a user or some type of controller), the light (e.g., and LED light) may be turned off to conserve energy in the light's capacitor (which may normally be used to keep a circuit running and measuring off time).

Delays between performing different operation schemes attendant to this widely-used power cycling/scheme switching method can lead to safety issues (e.g., pool is dark and may not be readily seen by individuals at night) and undesirable user experiences. With respect to the latter, a user may have to wait 10+ seconds to see a change in operation to a scheme selected from a phone application, control panel, computer, or the like. Despite these operational shortcomings, this type of delay persists with lights and pool systems from many pool equipment and system manufacturers such as PENTAIR, JANDY, and HAYWARD.

Pool and/or spa control ("PSC") panels are frequently installed with pools and spas to initiate, monitor, and control functions of equipment generally responsible for, or encompassing of, overall pool and/or spa operations. In this respect, PSC panels are often used to coordinate operations of one or groups of lights according to various pre-determined operation schemes recognized as options by the PSC panel. To do this, PSC panels may incorporate high voltage relays (known with the art and sometimes referred to herein as "control points," or auxiliary outputs, relays, or connections) that can be independently controlled by the PSC panel (and thereby a pool owner or user). In this regard, PSC panels are frequently used to control a high voltage side of a transformer for a light of a pool lighting system. As a result, these PSC panels are often installed with pools and spas that incorporate various combinations of lighting technologies. These PCS panels can offer a solution for centralizing control of lighting operation schemes that many pool owners and users find appealing.

However, the issues of safety and delay resulting from switching between lighting operations schemes persist with PSC panels. Furthermore, simple controls like brightness, color, and color intensity settings for lights are difficult to, or can not be set with, PSC panels. For example, in some systems brightness may be changed between two or three setting for a single color of light that a light is capable of emitting.

Attempts to solve the issues discussed herein have involved the use of a specially rated wire embedded with a dedicated communication cable. However, a cost of the wire used can be prohibitive and installation of the wire can require additional components and be complex. Further, significant changes to a control panel (e.g., a PSC panel) are required to facilitate communication to the lights with the additional wire. Other proposed solutions include placing a high frequency data signal on power wires directly. Since a high voltage side of a transformer supplying power to a light will likely be controlled by a PSC panel, a drawback of this solution includes a requirement for an expensive and complex coupling circuit on a low side of the transformer. In addition, due to length, a wire for this solution can produces capacitive and inductive loads that can impact a signal quality of a communication signal to lights.

Improved techniques of controlling low voltage devices are described in U.S. Pat. No. 10,299,342 ("the '342 patent") and its related applications, which have one or more common inventors with the present disclosure and are expressly incorporated by reference in their entireties. In one example of an improved technique, the '342 patent describes a system that can have a device controller with a power source electrically coupled to a power input, a transformer electrically coupled to the power input, and multiple power interruption mechanisms electrically coupled in parallel with a same low voltage side of the transformer. The transformer may convert the power input from a high-voltage alternating current ("AC") input to a low-voltage output source on a second side (same low voltage side).

As described in the '342 patent, each of the multiple power interruption mechanisms may have at least one relay electrically coupling the low voltage side to a respective load powered by the device control system, such that power to the load can be selectively interrupted by that relay based on a signal from the device controller. Each power interruption mechanism can be configured as an individually addressable mechanism, and as a result, the device control system is enabled to control multiple individually-regulated components coupled to the relays, with the (one) transformer. However, the device control system of the '342 patent does not specifically address a delay that occurs when switching between light operation schemes.

As a result, a need exists for systems and methods for operating lights of pool systems that enables rapid communication of and changing between desired modes of operation involving different settings for a desired light operation scheme, brightness, color, and/or operation speed. Further, a need exists for systems and methods for operating lights of pool systems that accomplish the above using components that are not expensive and do not require complex procedures for installation and implementation.

SUMMARY

Examples described herein include systems and methods for operating lights can include stepping down a high voltage power supply and transmitting a resulting low voltage through a relay to a light. A device controller system can receive a selected mode for operating the light including a setting for brightness, color, or operation scheme. The selected mode can be converted into a command configured to cause the light to operate continuously while changing from a current mode of operation to the selected mode. The system can determine an operation sequence for the relay to convey the command to the light. A schedule for the operation sequence can include a zero cross operation by the relay indicating, to the light, the setting or an operation mode change. The relay can operate according to the operation sequence and the schedule and the light can change to from the current mode to the selected mode without delay.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Figure 1:
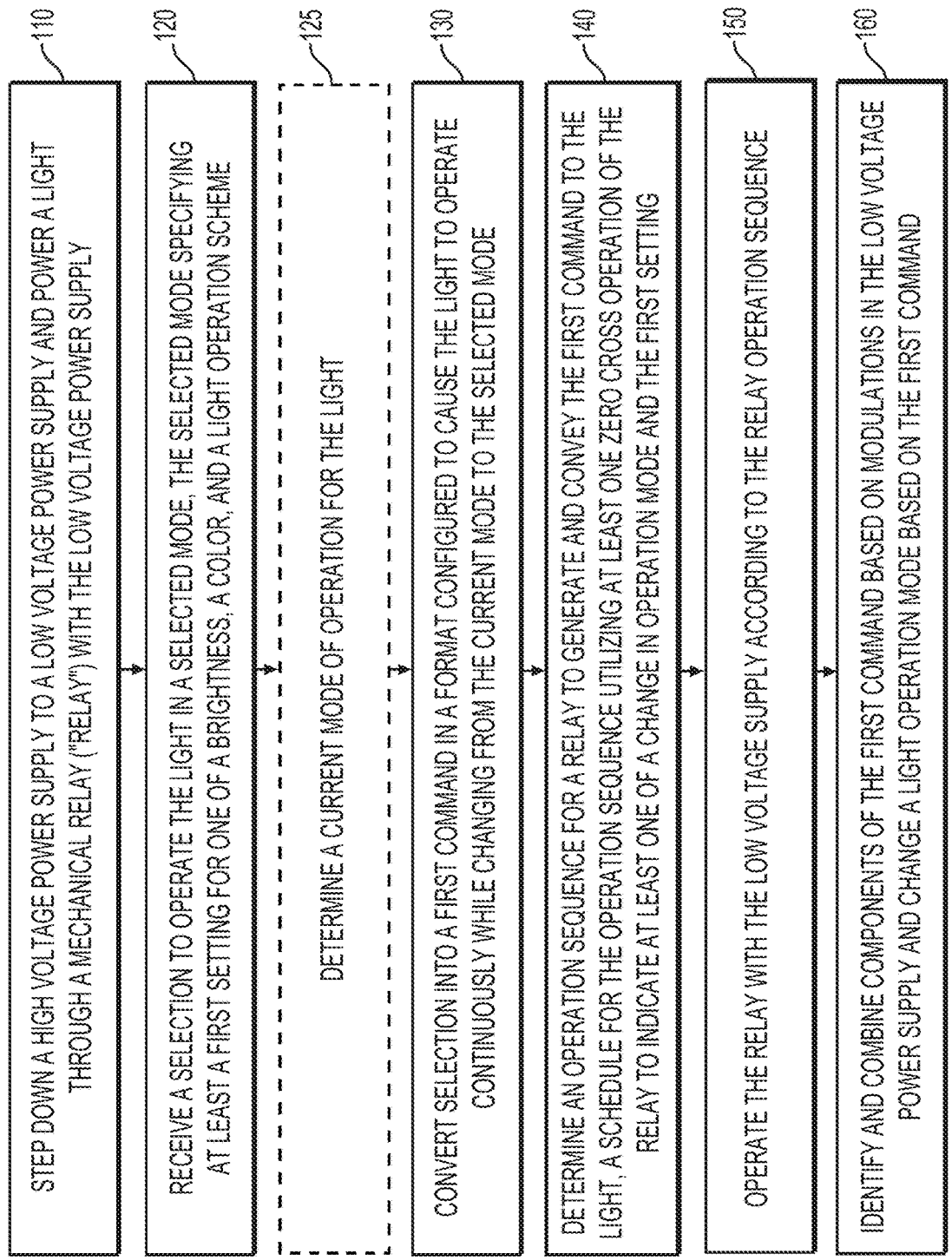
FIG. 1 is a flowchart of an example method for rapid communication and initiation of an operation mode for lights of a lighting system using mechanical relays.

Reference will now be made in detail to the present examples, including examples illustrated in the accompanying drawings. Wherever possible, the same reference numbers will be used throughout the drawings to refer to the same or like parts.

However, reference numerals and terminology used herein are for the purpose of describing particular aspects only and are not intended to be limiting. For example, as used herein, the singular forms—"a," "an," and "the"—are intended to include the plural forms as well, unless the context clearly indicates otherwise. As another example, recitation of ranges of values herein are merely intended to serve as a shorthand method of referring individually to each separate value falling within the range. Unless otherwise indicated herein, and each separate value is incorporated into the specification as if it were individually recited herein.

Furthermore, it is noted that any one or more aspects or features described with respect to one example, may be incorporated in different examples described herein, although not specifically referred to or otherwise described relative thereto. That is, all examples and/or features of any aspect described herein can be combined in any way and/or combination. Thus, all methods described herein can be performed in any suitable order unless otherwise indicated herein or otherwise clearly contradicted by context.

Example systems and methods described herein relate to operating lights and include stepping down a high voltage power supply and transmitting a resulting low voltage through a relay to a light. A device controller system can receive a selected mode for operating the light including a setting for brightness, color, or operation scheme. The selected mode can be converted into a command configured to cause the light to operate continuously while changing from a current mode of operation to the selected mode. The system can determine an operation sequence for the relay to convey the command to the light. A schedule for the operation sequence can include a zero cross operation by the relay indicating, to the light, the setting or an operation mode change. The relay can operate according to the operation sequence and the schedule and the light can change to from the current mode to the selected mode without delay.

FIG. 1 is a flowchart of an example method for rapid communication of, changing to, and initiation of an operation mode for lights of a lighting system using mechanical relays. At stage 110, a transformer for a device control system ("DCS") can, or continue to, step down a high voltage power supply to a low voltage power supply. The low voltage power supply powering at least one light through a mechanical relay ("relay").

In stage 120, a selection to operate the light in a selected mode can be received. In one example, the selection can be received through a user interface provided by the DCS. In another example, the user interface may be provided through a stand-alone device ("user device") that constitutes or otherwise includes a computing device having a processor, a memory storage, and a non-transitory computer-readable medium containing instructions that are executed by the processor. Examples of user devices include but are not limited to phones, tablets, laptops, and desktop computers. In yet another example, the user interface may be provided through a PSC panel.

In any of the examples listed above, a light operation selection service may be implemented on a device that provides the user interface and receives the mode selection. A representation of the light operation selection service may be presented via the user interface, and include different selectable setting options for operational features of lights including brightness, color, intensity, light operation scheme (e.g., light show), and speed by which lights perform light operation schemes. Processes performed by the light operation selection service, including presenting, receiving selections for, and communicating selections of setting options for the different operational features, may be directed through the user interface.

As used herein, a light operation mode can incorporate one or more operational features of a light or group of lights. For example, a first light operation mode can include one or more lights emitting steady (e.g., non-flickering) default color of light at a brightness level of 60% of the light's maximum brightness capability. A second light operation mode can include the one or more light emitting a non-default color of light in pulses at a default brightness level of 100%. The first light operation mode can result from selecting a setting option just for the brightness operational feature. Whereas the second light operation mode can result from selecting setting options for emission pattern and light color operational features. Accordingly, each light operation mode can include a unique combination of operational features (including light operation scheme) and the setting options selected for each operational feature in the combination.

It will be noted that a light operation mode can include, by itself, a light operation scheme as dictated by scheme library incorporated by a light controller for a light or a PSC panel. In addition, light operation modes such as the first or second exemplary operation modes discussed above, can omitting a setting option for operation scheme. Thus, the systems and methods of the present disclosure enable operation of lights in modes that are independent of pre-set operation schemes that a light may be programed to perform. Still further, a light operation mode of the present disclosure can include a setting for a light operation scheme in combination with a setting for brightness, color, intensity, or operation speed. Accordingly, a number of light operation modes provided by systems and methods of the present disclosure will be greater than a number operation schemes a light may be preset to perform. In one example, a number of light operation modes may be equal to the sum of each operational feature not including operation scheme, raised to a number of preset operation schemes. An example formula for determining a total number of light operation modes is provided below.

$$O_{tot} = b^s + c^s + e^s$$

$O_{tot}$=total number of operation modes
b=total number of brightness settings
c=total number of color settings
e=total number of speed settings for patterned/pulsed light emission
s=total number of operation schemes Following stage 120, the exemplary method can optionally include stage 125. In optional stage 125, a current mode of operation for the light may be determined. In one example, this can include the light operation selection service polling a PCS panel, a command implementation service installed with the light, and/or a device controller of a DCS to determine what mode of operation a light is currently executing.

In one example, where an ON-OFF operation is used by a light controller to recognize a change in operation schemes for the light, the information obtained in stage 125 can be used specifically to determine if the light operation mode includes, and the light is operating according to, one of the preset operation schemes for the light. In turn, a relay operation sequence determined for changing to the selected operation mode may include power supply interruptions of a minimum length. This may be the case where it is determined that a light system needs to be in a safe mode with limited functionality, for example if a fault is detected in one or more electrical components that facilitated adjustments to brightness, color, or speed. In another example, this information may be used to determine it is easier for a system to change an operation mode of the light utilizing a default method for a light controller of ON-OFF recognition (e.g., where a selected mode only differs from a current operation mode by change operation scheme to a next operation scheme in the light's scheme library).

In another example, optional stage 125 may be performed for the purpose of communicating a current operation mode through a user interface. Accordingly, the current mode can be presented in the user interface for a user to reference in selecting a different mode of operation. In one example, individual settings for operational features of a current operation mode can be determined and displayed for the purpose of informing a user's next selection of an operation mode.

In stage 130, the selected mode may be converted into at least one command that is provided in a format that is configured to cause the light to operate continuously while changing from the current mode to the selected mode. In one example, the command can include a series of commands, each command corresponding to a setting for an operational feature that is part of the selected operation mode. In another example, the command may include a notification that signals to a DCS that a lighter operation mode is going to change and to listen for commands that provided the settings for certain operational features that define the selected light operation mode. Tables 1 and 2 discussed with reference to stage 226 of FIG. 2, relate to one example for converting a selected mode to a command At stage 140, an operation sequence for a relay to generate and convey the first command to the light is determined. The operation sequence is determined based on a utilization of at least one zero cross operation of the relay to indicate at least one of a change in operation mode and the first setting. In one example, a device controller for the DCS is programmed with a setting time and a release time for each relay it is configured to control the operation of. The setting and release times are derived from a propagation delay for each relay. In one example, the relay controller may be provided with this information when the DCS is installed. For example, an installer may set values for the setting and release times for each relay in a memory of the device controller of the DCS. The values used by the installer may be obtained from specifications or based upon recommendations by a manufacturer of the relay.

In one example, the operation sequence is structured to produce a modulated, or interrupted, low voltage power supply to the relay. Operation of the relay (e.g., an armature making contact or be released from contact) according to the power supply will generate a power signal that can be detected or otherwise recognized by a command implementation service installed on the light. More specifically, the light, through the command implementation service, will be configured to recognize modulations of a certain degree or interruptions of a particular duration, as bits of information that depending on an order in which they are received, corresponding to different settings for operational features of the light.

Thus, in stage 140, the selected mode may be converted into a first command that will be translated into an operation sequence for a relay, that when executed, will produce a signal (e.g., waveform) that can be recognized by a light as a package of information. In particular, the light can be configured to recognize the relay-produced signal in components of the first command. Further, based on this component recognition, settings for operational features of the light may be changed almost instantaneously with a delay or interruption in the light's operation. In one example, a delay between in the light's operation in a current mode and a selected mode is less than ten (10) seconds. In another example the delay is less than five (5) seconds. In yet another example, the delay is less than one (1) second.

In one example, the operation sequence can incorporate a notification command and the first command. The notification command may include one or more command components corresponding to power interruptions that will signal the light to listen for a change to the operation mode it is executing.

In stage 150, the relay controller for the DCS can operate the relay with the low voltage supply according to the relay operation sequence determined in stage 140. As a result of the relay can in effect, transmit a signal of a low voltage power supply in a waveform that the light is configured to recognize in stage 170 as a command for changing its mode of operation.

At stage 160, the light can identify and combine components of the first command based on the low voltage power supply signal detected, and change a light operation mode according to the first command.

Figure 2:
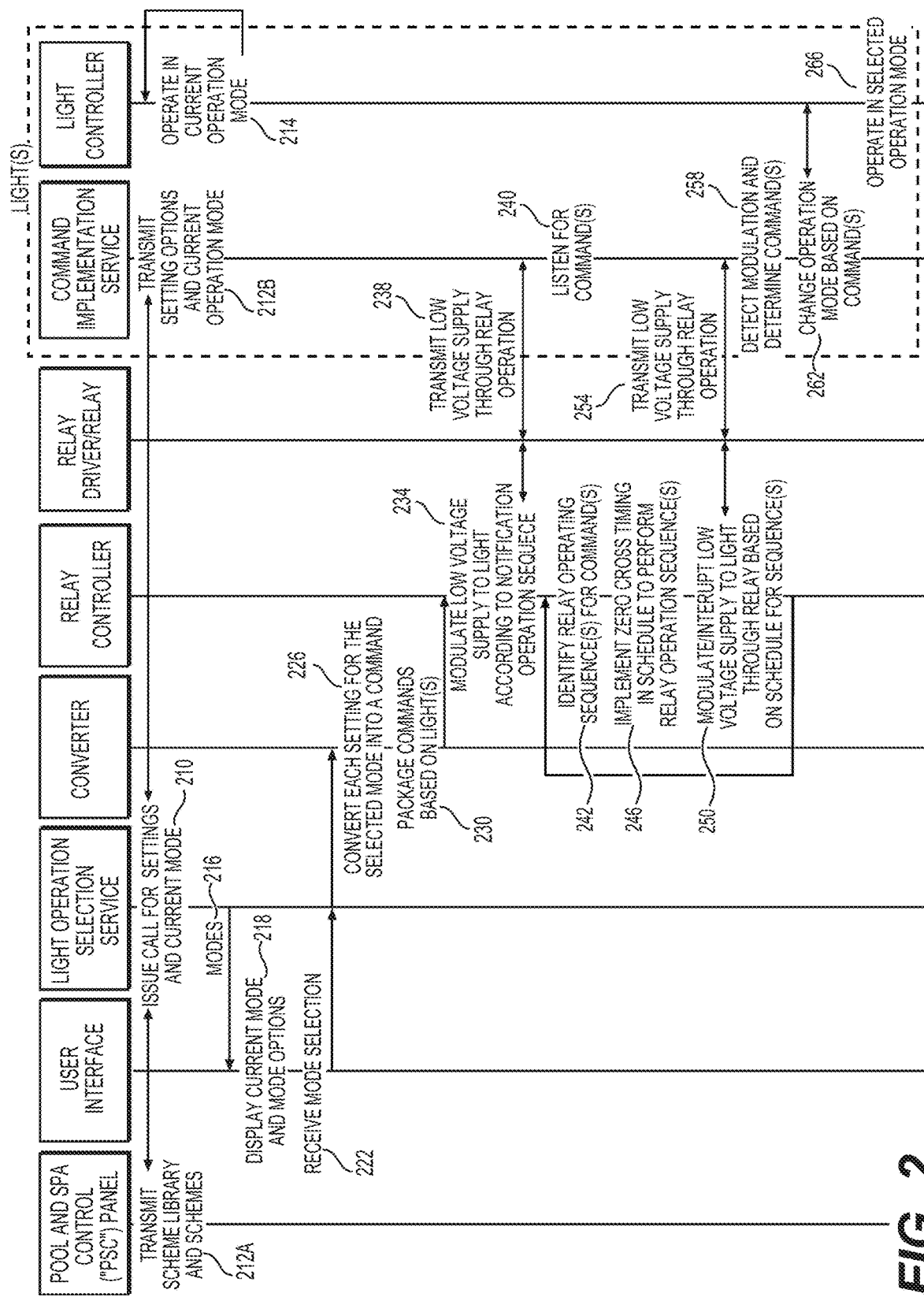
FIG. 2 is a sequence diagram of an example method for rapid communication and initiation of an operation mode for lights of a lighting system using mechanical relays.

FIG. 2 is a sequence diagram of an example method for rapid communication and initiation of an operation mode for lights of a lighting system using mechanical relays.

At stage 210, a light operation selection service can issue a call for settings and a current light operation mode from a PSC panel and a light controller. As noted above the light operation selection service can be implemented on device including a user interface such as the PSC panel, a stand-alone computing device, or a DCS.

In one example, the light operation selection service can include a device-level component, such as an API or device system-specific application; and an application-level component, such as an API, software development kit ("SDK"), or application wrapper. The device-level component can include system level privileges. The application-level component can include privileges in certain applications, such as a web- or dedicated-records system application, which can be developed for operation with the PSC panel, a device controller for a DCS, and a light controller. Reference to the light operation selection service is understood to include either or both of the device-level and application-level components unless otherwise specified. In another example, the light operation selection service can be provided as a web application and accessible through a network, such as the internet, from any computing device that is included in the PSC panel, stand-alone device, or DCS.

In stages 212A and 212B, the PSC panel and light can transmit a scheme library, schemes, and setting options. In another example, either of the light, via a command implementation service, or the PSC panel can communicate current operation mode to the light operation selection service. It will be noted that recognition by systems of the present disclosure, via, for example, a light operation selection service, a relay controller, or a command implementation service, is not required to change current light operation mode to a selected operation mode. The systems disclosed herein can operate, for example in a type of backup or safe mode, like other relay-inclusive systems that use ON-OFF-ON power cycling to change light operation schemes.

However, as explained in more detail with respect to stages 234 and 236, a method of the present disclosure implements relay operation sequences in order to generate, with the relays, specific signals that can be recognized by the command implementation service as carrying information. More specifically, information derived from the relay-generated signals can include settings for different operational features such as operation scheme, brightness, color, operation scheme speed, or light intensity, that can be implement with the light immediately regardless of mode the light is currently operating according to.

In another example, stages 210, 212A, and 212B may be performed so that a current operation mode and all possible setting options (the different combinations of which define different light operation modes), can be displayed in a user interface respectively for review and selection by a user.

Stage 214 of the method can include a light controller(s) operating a light(s) in a current light operation mode. As discussed in more detail with respect to stage 266, operation of transitioning the light from any operation mode to any selected operation mode can occur almost instantaneously upon the selection of a new operation mode in stage 222. It will be noted that as stages 218 to 262 are performed, the light controller can operate the light according to the current operation mode continuously and uninterrupted.

In stage 216, the light operation selection service can transmit the operation mode options to a user interface. At stage 218, the current light operation mode (presented for a user's reference) and setting options for some or all the operational features the light is capable of, may be displayed in the interface. In one example, a menu may be displayed in a graphical user interface ("GUI") for each operational feature. For example, for the operational feature of a light operation scheme, a name or description of each light operation scheme in a library of schemes established by the light or the PSC panel can be listed. Ranges may be displayed for brightness, scheme speed, or light intensity.

Following this display, an operation mode may be selected by a user through user interface in stage 222, and transmitted to the light operation second service. The operation mode may include a combination of settings for different operational features. For example, the selected operation mode can specify light operation scheme no. 9 out of 12, a brightness of 80%, one or more colors for different parts of the operation scheme, and an operation scheme speed. The light operation selection service can forward the selected operation mode to a converter provided, in one example, in the DCS. In other examples the converter may be provided in a device that implements the light operation selection service.

In one example, the converter may be provided as a service similar to the light operation selection service or the command implementation service. In other examples, the converter may have access to tables, algorithms, and other operation mode information stored in a memory of the DC, an internal memory of a user device, by a cloud storage service, or other data storage solution. At stage 226, the converter can read each setting included in the selected light operation mode transmitted in stage 222, and convert that setting into a command. As discussed above, and with reference to Table 1, a command can include a series of components, each component having one of two values.

TABLE 1

| Command Segment Name | Positions in Command Assigned to Components (Bits) of Command Segment | Component Values | Description | Example Value |
|---|---|---|---|---|
| Preamble | 0, 1, 2, 3 | 1 or 0 | Preamble for light to start listening for command | b1111 |
| Operational Feature | 4, 5, 6, 7 | 1 or 0 | 4-component feature code | See Table 2 |
| Payload | 8 to x | 1 or 0 | Feature-specific payload | See Table 2 |

In one example, each operational feature may be assigned a respective command code of component values. Further, a segment of a command that corresponds a setting for a particular operational feature may be of a specified length or number of components. An example of this command format is provided with Table 2. As one of ordinary skill in the art will recognize from Tables 1 and 2, an exemplary command can include a command segment that a relay controller and a command implementation service recognizes as a preamble. As discussed with reference to stages 234 and 238, where the preamble has a certain value, the command implementation service will start to listen for a selected light operation mode to switch the light into. More specifically, the command implementation service will start to listen for a signal that it recognizes as a command segments from which an operational feature, and a setting for that operational feature, can be identified.

TABLE 2

| Operational Feature | Feature Code | Description | Payload Length (x) Bit 9 to 9 + (x − 1) | Example Payload Values | Example Command (Preamble + Op Feature + Payload) |
|---|---|---|---|---|---|
| Reserved | b0000 | Reserved | | | |
| Manufacturer | b0001 | Set equipment man (sets scheme library man's library) | 2 | b00 - reserved<br>b01 - Man. A<br>b10 - Man. B<br>b11 - Man. C | b1111 0001 11<br>(List. Set Man C)<br>11 bit command |
| Brightness | b0010 | Set brightness | 3 | b000 - reserved<br>b001 - 20%<br>b010 - 40%<br>b011 - 60%<br>b100 - 80%<br>b101 - 100% | b1111 0010 011<br>(List. Set Br 60%)<br>12 bit command |
| Color | b0011 | Set light to specific color | 28 | 1st 7 bits - R value (0-100)<br>2nd 7 bits - G value (0-100)<br>3rd 7 bits - B value (0-100)<br>Last 7 bits - W value (0-100) | |
| Operation Scheme | b0100 | Set light operation scheme | 5 | Scheme number (1-17) | |

Thus, stage 226 can include the converter recognizing settings for operational features of a selected mode and generating commands that represent those settings. These commands, as discussed with stage 242, can be translated into a sequence of relay operations. The sequence of relay operations, upon execution, will generate one or more signals (waveforms of a low voltage power supply) that is recognized by the command implementation service as the commands converted from the settings of the selected mode by the converter. In one example, the converter may read the settings specified in the selected mode, and access one or more look up tables to determine combinations of component values for respective payload segments of commands the converter generates in stage 226.

Although a binary value system (e.g., 1 or 0, OFF or ON, + or −) may be used for converting settings of a selected operation mode into respective commands, other value systems (e.g., decimal, hexadecimal), may be employed by the converter. In one example, the converter may be configured to use different value systems depending on a type or manufacturer of the PSC panel and/or lights.

In stage 230, the converter can package the commands converted in stage 222 together, and transmit them to a relay controller. In one example, this may include adding a preamble command segment to each command, or just the first command. In one example, the command implementation service can be configured to recognize specific combinations of component values in preamble command segment represent a respective command either is or is not a last command (setting) for a selected light operation mode that a light is being switched to. Accordingly, the converter can add a preamble in stage 230 to each command that indicates whether that command is the last setting for the selected operational mode. In another example, packaging of the commands can include adding one preamble before an entire group of commands defining the selected light operation mode, and command segment of a certain number of components and combination of component values that the command implementation service is configured to recognize as signaling a last setting of the selected mode has been received.

In another example, stage 230 can include organizing the commands in a certain order or otherwise specifying an order in which the commands should be implemented. This order can be dictated by an optimal operational sequence for the life of hardware components included in one or both of the DCS and the light.

At stage 234, the relay controller can modulate or interrupt a low voltage power supply according to a notification relay operation sequence. More specifically, the relay controller may interrupt the power supply and cause an armature of the relay to be released for each component in a preamble segment of a command that has a particular component value (e.g., 1). In turn, the release and engaging of the armature cause a signal for a low voltage power supply to have a specific (interrupted) waveform that is transmitted to the command implementation service in stage 238. Accordingly, the command implementation service begins to listen for commands in stage 240.

In one example, the relay controller may be preset to know the notification operation sequence that therefore does not need to identify operating sequences for commands representing different settings for various operational features as it does in stage 242 discussed below. This may particularly be the case where the notification sequence is only transmitted once when there is a change to a light operation mode, or in instances where a new selected mode only includes one setting for one operational feature. In other examples, stages 234 and 238 may not be included separately, but as part of every iteration of stages 242, 246, and 250.

In stage 242, the relay controller can identify relay operation sequences for the commands received in 230. In one example, this can include when, how many times, and in what sequence the relay controller will interrupt and re-establish a low voltage power supply to the relay. For example, to implement the example brightness setting from Table 2 (0010 011), subsequent to performance of the notification sequence (1111), the relay controller will determine that a power supply will be interrupted to the relay three times—one time for each component in the command having a component value of one (1).

At stage 246, the relay controller can implement zero cross timing for the relay operation sequence determined in stage 242. In one example, performance of stage 242 provides an overall sequence of power interruptions but not an exact timing, a schedule, of those interruptions with respect a waveform of low voltage supply being supplied to the relay.

As discussed in detail with reference to FIG. 3, systems and methods of the present disclosure minimize a reduction in an electrical life of a relay that could otherwise occur every time a new light operation mode is selected. Power interruptions and restorations are timed so that at instants when an armature of a relay is released or going to make contact, a waveform for a power supply to the relay is at a zero cross point. Thus, in stage 246, the relay controller, using relay constants for release and setting times, schedules specific times for de-energizations and re-energizations of a relay driver to occur in accordance with the operation sequence determined in stage 242. More specifically, de-energizations are scheduled to occur a period of time before a zero cross equal to the release time for components of the command that, for example, have a component value of one (1). On the other hand, re-energizations for the command are scheduled a period of time before a zero cross equal to the setting time.

In stage 250, the relay controller modulates/interrupts a low voltage power supply to light through relay based on operation sequence determine in stage 242 and according to the zero cross-based schedule of de-energizations and re-energizations of a relay driver determined in stage 246. At stage 254, the low voltage power signal having modulations/interruptions resulting from the relay's operation pursuant to stage 250, is transmitted to the light through the relay.

In stage 258, the command implementation service detects the modulated signal and identifies components of the commands. In one example, the command implementation service may access a memory or other storage component for look-up tables it may use to translate the waveform into the command that was determined by the converter in stage 226. In another example, the command implementation service may be able to determining the components of the command without an access to a look up table, but rather access the lookup table to translate the combinations of component values in command segments it identifies into specific settings for operational features of the light.

At stage 262, the command implementation service combines the command components and changes settings for the operational features of the light to the settings of the selected mode. In one example, in stage 262, the command implementation service transmits the new settings to a light controller that is operating the light in the current operation mode. In this example, the light controller changes the settings of the operational features instantly, with almost no delay, to cause operation of the light in the selected mode in stage 266. In another example, the command implementation service changes the settings according to the command and the light controller operates the light according to the selected mode.

Figure 3A:
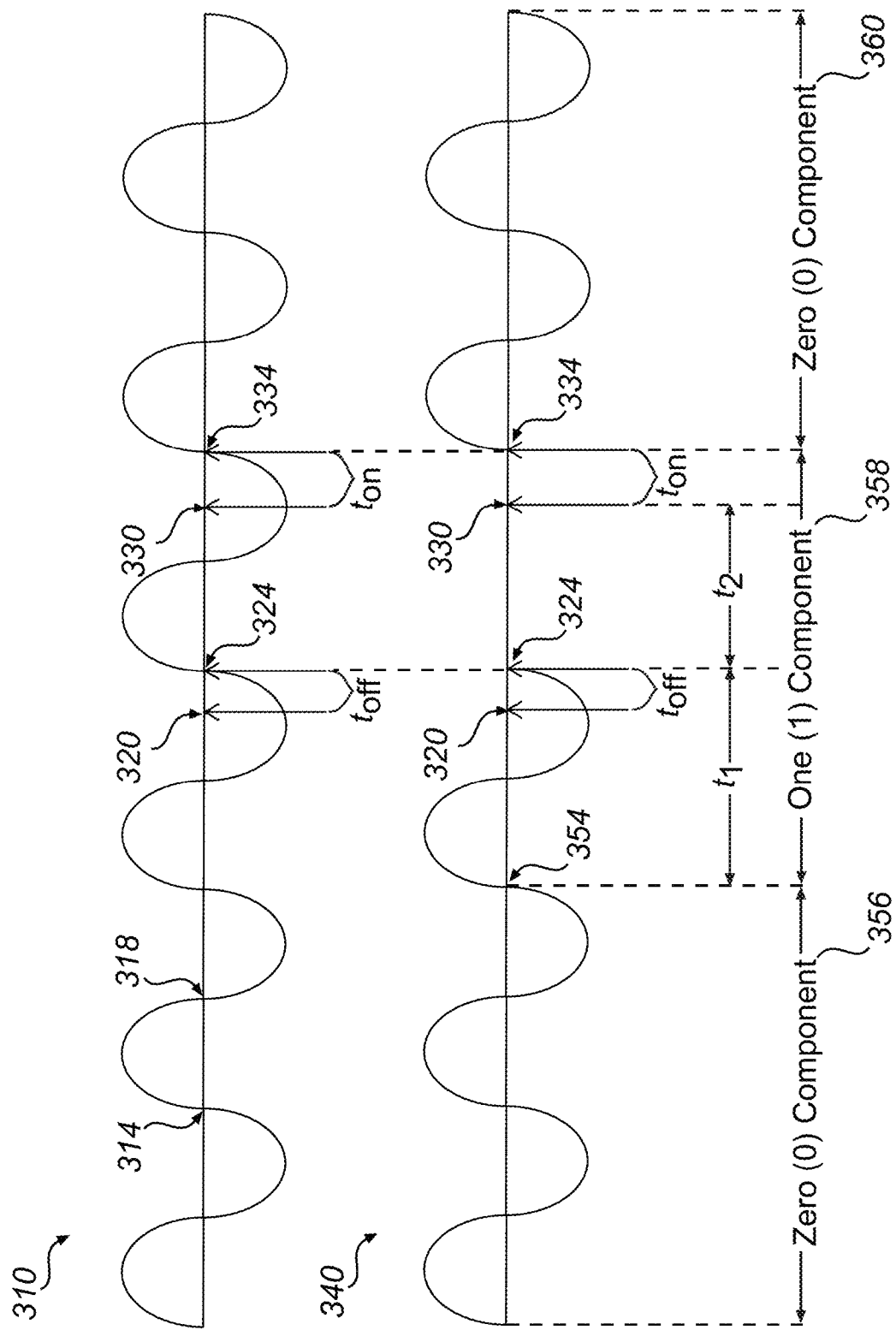
FIGS. 3A, 3B, and 3C illustrate waveforms related to providing a low voltage power supply to a light.
Figure 3B:
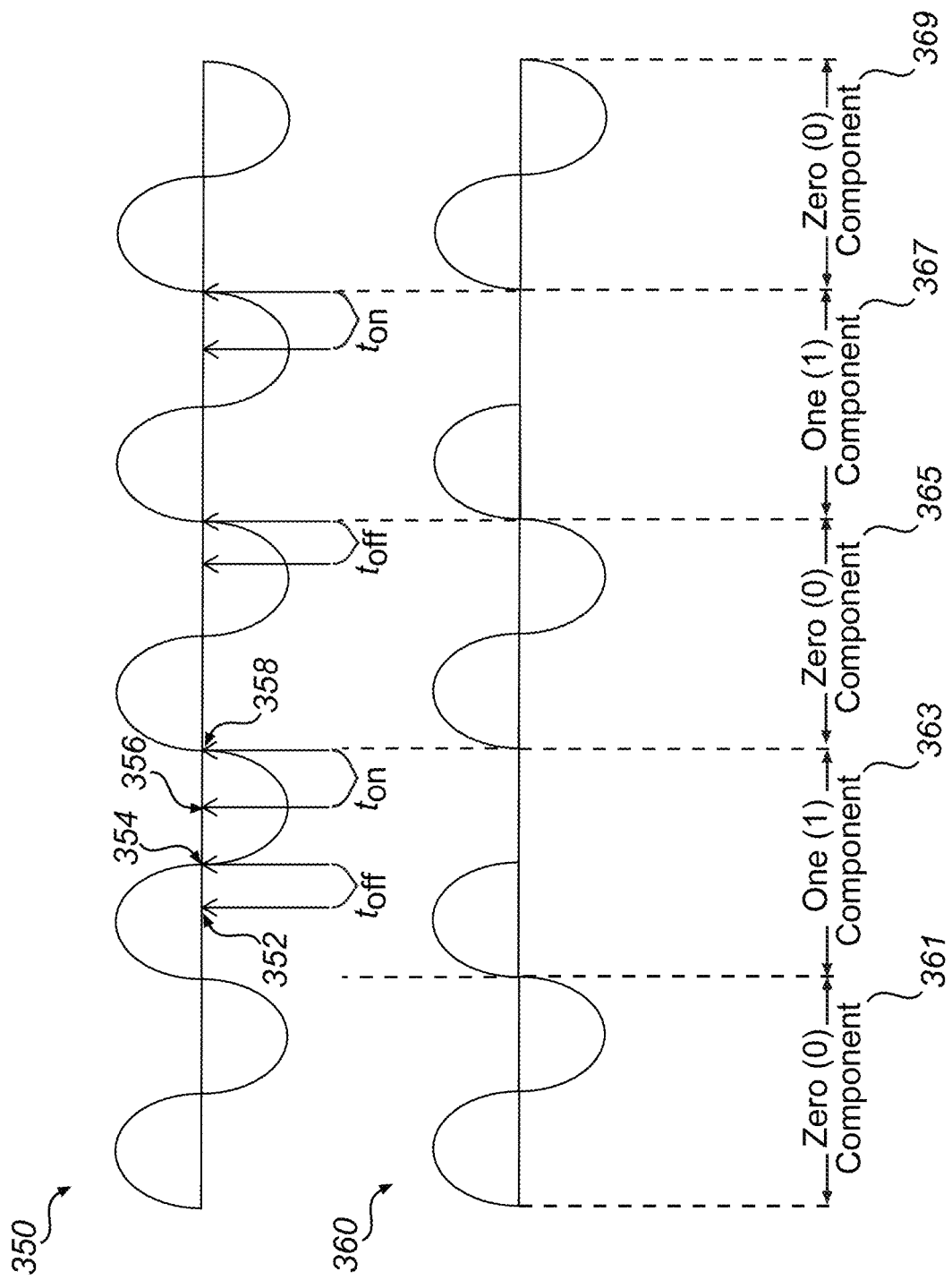
Figure 3C:
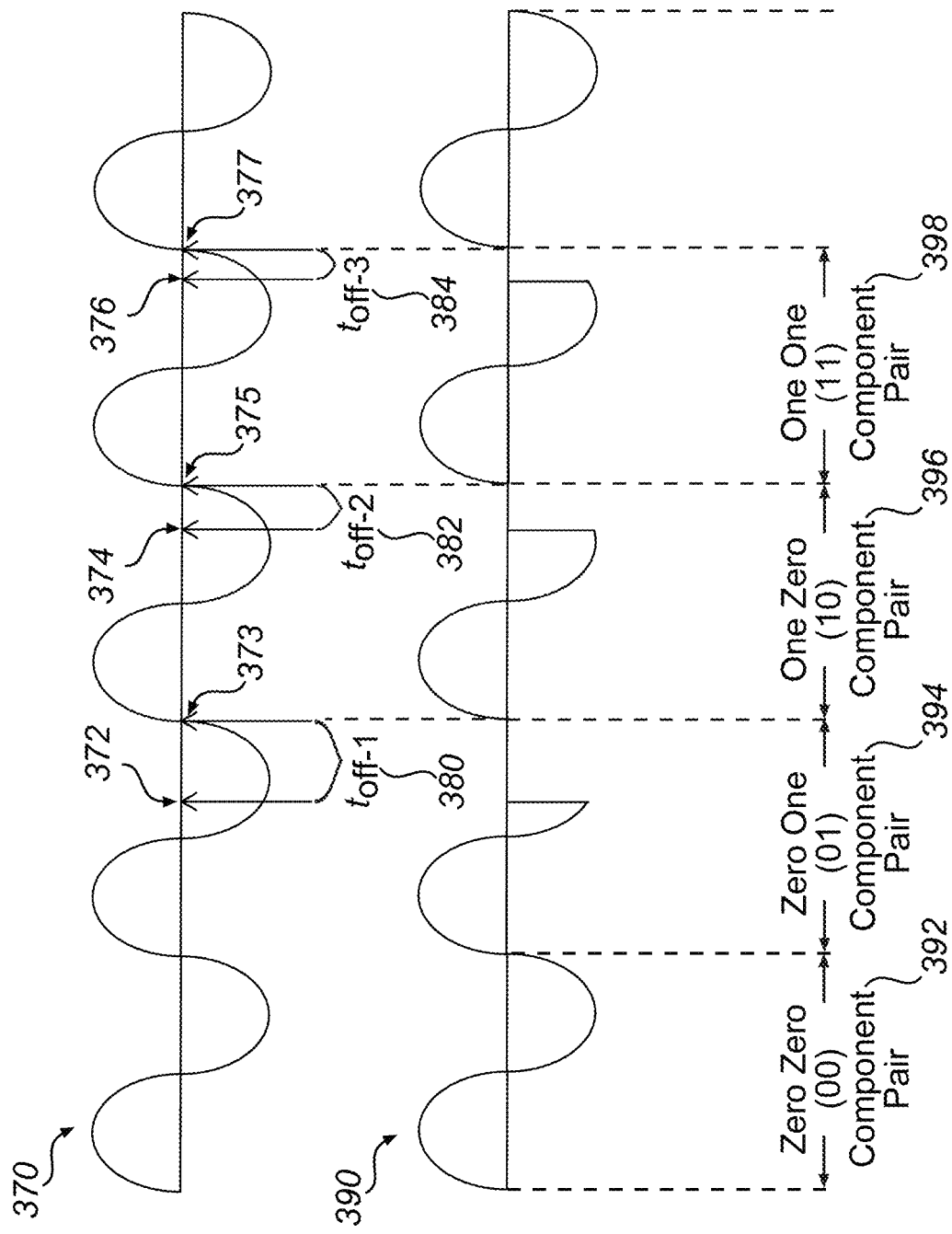

FIGS. 3A, 3B, and 3C illustrate waveforms related to providing a low voltage power supply to a light according to the methods described herein.

There is a propagation delay associated with every mechanical relay. When a relay driver is controlled to engage a relay, it takes some amount of time, referred to as a set time, for coils to engage a mechanical arm in a relay. Similarly, when a relay driver releases (e.g., deenergizes) a coil, some amount of time, referred to as a release time, is required for a mechanical armature to break contact. For example, relays used in some pool-specific light products have a set time of about 4.5 ms, and a release time is about 5.5 ms.

In addition to a set time and a release time, every relay will have a number or rating for a respective mechanical life and electrical life. One of ordinary skill in the art will recognize a mechanical life as a number of times that a relay can move back and forth before resistance builds up on a contact and no long allows for acceptable operation of a mechanical armature of the relay. In some examples, relay used in pool lighting systems may have a mechanical life of 10 million cycles. One of ordinary skill in the art will also recognize an electrical life of a relay as the relay's capacity to switch high loads (high current spikes). Some exemplary relays used in pool-system specific applications may have a rated capacity of 10 Å corresponding to an electrical life of 20,000 cycles. Thus, for a relay with a mechanical life of 10 million cycles, and an electrical life of 20,000 cycles, the operative life of the relay is likely to be limited by its electrical life. Furthermore, this electrical life can be consume fairly quickly.

However, the systems and methods according to the present disclosure address this aspect of relay operation by causing relays to fire at a zero cross of a sine wave corresponding to a low voltage power supply being transmitted to the relay. As will be readily understood by those of ordinary skill in the relevant art, a zero cross corresponds to a period in time in which a voltage being carried from a source, here a low voltage side of a transformer, to the load, a light such as an LED light, is zero and hence a current in a circuit that carries the voltage is zero. In this state, a loading on the relay is zero and firing in this state does not compromise or other wise has no diminishing affect on the electrical life of the relay. But, firing a relay at zero cross itself will not allow a mechanical armature to make contact and complete a circuit at zero cross because of a propagation delay associated with moving the relay into a contact state.

FIG. 3A illustrates an exemplary voltage waveform 310 from an AC transformer, where zero crosses are identified with numerals 314 and 318. According to an aspect of the present disclosure, a device controller such as the device controller discussed with FIG. 2, may be preset, or receive values for a release time ($t_{off}$) and a setting time ($t_{on}$). For example, $t_{off}$ for a relay may be 4.5 ms and $t_{on}$ may be 5.5 ms. Thus, to disengage the relay at a zero cross such as zero cross time point 324, a relay driver must de-energize a mechanical armature at time point 320, 4.5 ms before a zero cross corresponding to time point 324 ("zero cross 324"). Similarly, to fire the relay so that it is turned on a zero cross corresponding to time point 334 ("zero cross 334"), the relay is turned on ("fired") at time point 330 by the driver circuit so that an armature of the relay makes contact at zero cross 334.

A second waveform 340 illustrated in FIG. 3 represents a modulated (or interrupted) waveform that is output as a result of the releasing and firing operations at time points 320 and 330. The second waveform 340, specifically the modulations/interruptions thereof, may be detected by a command implementation service as described with FIG. 2.

In one example, a command may be comprised of a series of components which are defined as a value or other type of informational element that can be recognized by a device controller and a command implementation service. In one example, components of a command may represent bits of information, i.e., the basic unit of information in computing and digital communications. In this example, a component value may represent a logical state with one of two possible values, a one (1) or a zero (0). However, other representations, such as true/false, yes/no, +/−, or on/off may be transmitted, read, recognized, and processed by, for example, a light of a pool light system.

The second wave form 340 illustrated in FIG. 3 represents a three component (three-bit) command including a first component 344, a second component 346, and a third component 348. The first and third components 344, 348, wherein low voltage power supply to a relay is uninterrupted, each represents a component value of zero (0). On the other hand, the second component 346, wherein the power supply to the relay is interrupted represents a component value of one (1).

As shown in FIG. 3, a first time segment $t_1$ of the second component 346 corresponds to a period of time where a relay is ON, and includes the release time ($t_{off}$). A second time segment $t_2$, which in this example follows immediately after a zero cross 324, corresponds to a period of time in which the low voltage signal is not transmitted to or through the relay. During the first time segment $t_1$, the relay continues to receive an un-interrupted low voltage supply until time point 320 when a relay driver is de-energized and the low voltage supply is interrupted. However, the relay remains ON due to a propagation delay in the relay for releasing, in one example, an armature, such as a mechanical armature, of a relay. But de-energization of relay driver is timed to occur so an amount of time between time point 320 and the zero cross 324 is equal to the release time $t_{off}$ (which is equal to the propagation delay), and the armature therefore disengages from contact at the zero cross 324.

Since the second component 346 includes the first time segment $t_1$, where the relay is ON for that period of time, a light powered through the relay can continue to function as the relay communicates the second component 346 to the light. Taking this one step further, since command components with a component value of one (1) include this amount of ON amount (first time segment $t_1$), a light can continue to function during a communication of a series of components having a one (1) component value. Thus, even when a command includes 111111 is communicated to a light through a relay according to methods and systems of the present disclosure, the light will continue to operate.

In some examples, an OFF-ON-OFF-ON-OFF-ON function for switching between light operation schemes as described in the Background of the present disclosure, may be retained by lights operated according to the exemplary methods described herein. The goal here being to make lights backwards compatible. To accomplish this, interruptions in low voltage supplies to relays may be time so as not to trigger a recognition and determination by a light that a light operation scheme has been changed. For example, the second time segment $t_2$ may specially set to have a duration, for example 16 ms (1/60 Hz), that will not trigger a light from processing this off time as having received an OFF-ON-OFF-ON-OFF-ON command that changes the light operation scheme the light is presently. In one example, an OFF time for such OFF-ON-OFF-ON-OFF-ON method, may be is approximately 400 ms.

FIGS. 3B and 3C illustrates an exemplary third, fourth, fifth, and sixth voltage waveforms 350, 360, 370, and 390 from an AC transformer. With the third and fourth waveforms 350 and 360, zero crosses are identified with numerals 354 and 358. For fifth and sixth waveforms 370 and 390, zero crosses are identified with reference numerals 373, 375, and 377.

Relative to the example waveforms in FIG. 3A, FIGS. 3B and 3C provide examples of increased bandwidths being carried through low voltage power signals transmitted to a light through relays. For example, a number of cycles of the fourth waveform 360 used to convey a single component of a command is half that of second waveform in FIG. 3A. More specifically, first, second, third, and fourth components 361, 363, 365, 369 are conveyed through a relay with one cycle of a signal as opposed to two cycles in FIG. 3B. More significantly, timings for two zero cross operations of a relay must be determined and implemented within a single cycle of a signal for the fourth waveform.

In FIG. 3C, a relay is configured to implement one of three zero cross release times toff-1, toff-2, toff-3, to convey component pairs. Accordingly, the sixth waveform is configured to, and a command implementation service is configured to recognize, twice as much information based on a zero cross-timed operation, than in the case of the fourth waveform 360. In one example, a relay used to produce the waveforms of FIGS. 3B and 3C may include an insulated-gate bipolar transistor, a solid-state relay, a Triac, or a Diac.

Figure 4:
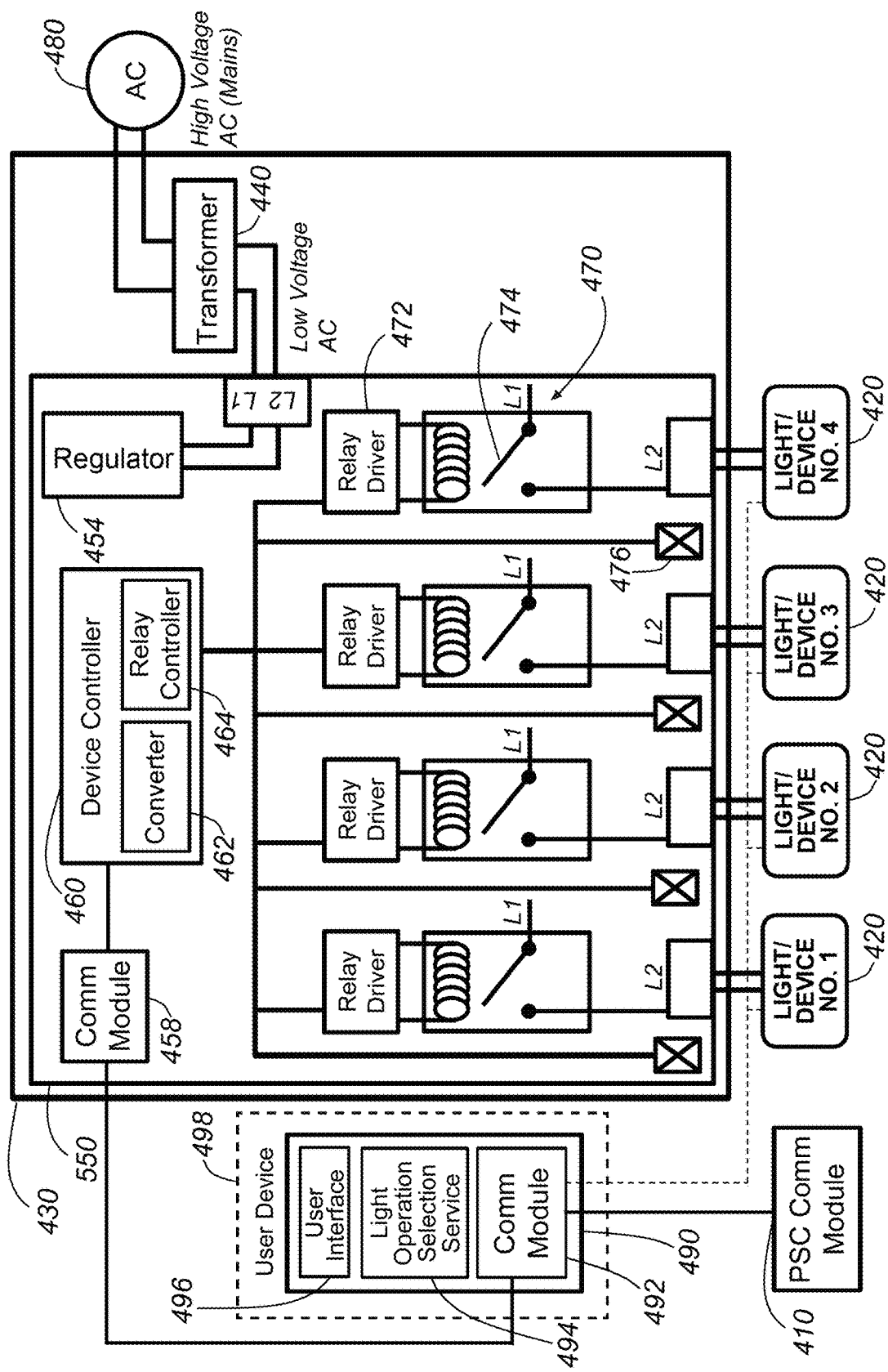
FIG. 4 illustrates a schematic view of a device controller system ("DCS"), according to aspects of the present disclosure.

In FIGS. 3A, 3B, and 3C systems according to the present disclosure include components, such as a converter, relay controller, and command implementation service, that recognize values of components of a command based on timings of relay operations relative to zero crosses in a waveform. More specifically, one component of information is conveyed based on a recognition a delay time being accounted for in a timing of an interruption of a low voltage power supply to a relay relative to a zero cross of a waveform for signal being transmitted by the relay to a light. FIG. 4 illustrates a schematic view of a DSC 450 provided in a housing 430 with a transformer 440, according to aspects of the present disclosure.

Energy from the high voltage AC power source 480 is coupled to the DCS 450 through the transformer 440, which is connected to the two connection leads L1 and L2. Power can be provided from a low voltage side of the transformer 440 to each of the relays 470 illustrated in FIG. 4. The DCS 450 couples the two connection leads L1 and L2 to each of a plurality of relays 470 through a voltage regulator 454. More specifically, for each relay 470, an L1 connection lead can be connected to the relay 470 and the voltage regulator 454. The voltage regulator 454 can be an electronic circuit that provides a stable direct current (DC) voltage independent of a load current, temperature, and AC line voltage variations.

A device controller 460 of the DCS 450 includes a converter 462 and a relay controller 464 that interfaces with each of the relays 470 through a relay driver 472 associated with each relay 470. Operation of each of the relays 470 can be directly caused by an operation of a respective relay driver 472, which is controlled by the relay controller 464 based on commands received from the converter as described herein. More specifically, during operation, the relay 470 can switch connection L1 to a load when commanded by relay controller 460 through a respective relay driver 472. As a result, the relay controller 464 can implement zero cross timing ON/OFF relay operation sequences in which the an off period can be controllably metered so as not to trigger an ON/OFF/ON light operation scheme change, or trigger such a change if desired. Accordingly, the combination of the converter and the relay controller can implement a multitude relay operation sequences on a low voltage side of the DCS 450 to provide a significantly number of different light operation modes within a variety of lighting and low voltage products represented by light/devices 420 in FIG. 4.

The DCS 450 further includes a first communication module 458 that, by way of a second communication module 492, puts the device controller 460 in communication with a user interface 496 and a light operation selection service 494. The second communication module 492 can also put all of the above components in communication with a third communication module 410 of a PSC panel. With the device controller 460, the DCS 450 is configured to control each of the circuits incorporating a relay 470 based on input (e.g., data, electrical signals, light signals, etc.) received from the communication module 458, and thus, from the light operation selection service 494 and/or the PSC panel (via the third communication module 410) as described herein with reference to FIGS. 1 and 2.

The DCS 450 includes at least two connection leads L1 and L2 coupled to each of a plurality of relays 470, through a voltage regulator 454. The voltage regulator 454 can be an electronic circuit that provides a stable direct current (DC) voltage independent of a load current, temperature, and AC line voltage variations. For each relay 470, an L1 connection lead is connected to the relay 470 and the voltage regulator 454.

Each relay 470 can further include a power monitoring circuit 476 configured to monitor an amount of current cycling throughout the DCS 450, and a nature/quality of the current. This in turn serves as a measure of the quality of power provided and shunted by a relay 470 to a respective low voltage device 420. In another example, the monitoring may include monitoring the overall current being utilized on a respective relay 470, overall power consumption, component power consumption, quality of the power provided, and similar data on the power and how it is being used. For these functions, the monitoring circuit 476 may incorporate a Hall-effect sensor, a fluxgate sensor, a fiber-optic current sensor, a Rogowski coil type sensor, and the like.

Incorporation of the monitoring circuit 476 enables the device controller 460 to have the capacity to monitor and report energy or power usage, and various parameters describing the quality of the energy supplied to the light(s) 420. Furthermore, direct control over a "powering on" function and communication with the various elements connected to the communication module 458. This can include, for example, scheduling operation times, scheduling maintenance periods, controlling operating modes, controlling operating parameters (e.g., brightness, color, etc.), controlling power consumption, controlling power usage, controlling overall power costs, and the like. The power monitor circuit 476, along with the data it collects, can also be utilized, to enable a user to monitor energy efficiency in real time, and adjust the systems operations to maximize energy savings, for example, by coordinating the scheduling of peak consumption operations with off-peak utility hours.

It is noted that the relays 470 are depicted as Single-Pole Single-Throw (SPST) relays, but in some examples could be provided in Single-Pole Double-Throw (SPDT), Double-Pole Double-Throw (DPDT), and other relay configurations. In another example, one or more of the relays 470 may comprise analog or solid state switches or relays, including, but not limited to, electromagnetic relays, reed relays, hybrid relays, thermal relays, MOSFET relays, TRIAC- and SCR-based devices, and similar analog and solid state relays.

Figure 5:
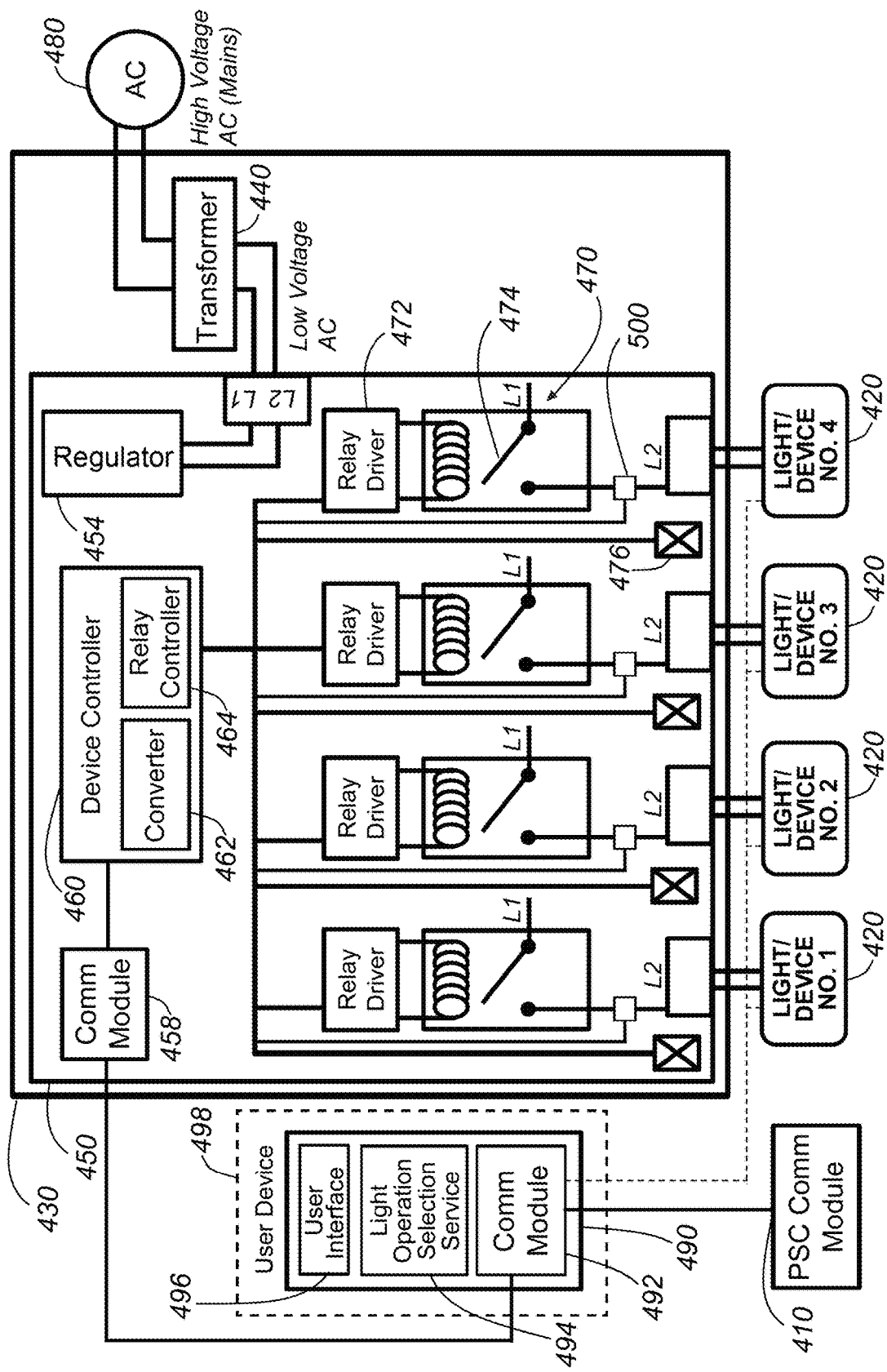
FIG. 5 illustrates a schematic view of a DCS, according to aspects of the present disclosure.

FIG. 5 illustrates a schematic view of a DCS 550 substantially similar to the DCS 450 of FIG. 4. However, in addition to a power monitor circuit 476, the DSC 550 of FIG. 5 further includes a relay sensor 500 for each of the relays 470. Each relay sensor can monitor a respective relay and detect aspects of that relay's performance when a relay driver is energized to fire the relay and set its armature of the relay, as well when the relay driver is de-energized to release the armature and disengage it from contact. In one example, the performance parameter measured by the sensor includes speed of operation. Each sensor can detect and continuously record an amount of time that elapses between driver energization and relay armature contact (a setting time), and an amount of time that elapses between driver de-energization and relay armature disengagement from contact (a release time).

Accordingly, the sensor is able to provide the relay controller with information directly corresponding to, or from which can be derived, relay constants that represent propagation delays for specific relay operations. As will be explained with reference to FIG. 6, this information can be used to determine zero cross timing dynamically, on a command by command basis. Over time, resistance in a relay armature may build up such that the relay moves slower than in an earlier part of the relay's lifespan. The sensor 500 continuously detects essentially the speed at which the relay is operating with the timing information. The relay controller can use this information to adjust setting and release times accordingly in scheduling relay operations based on zero cross time. More specifically, the relay controller can use the last setting time record by the sensor 500 as an amount of time before a zero cross that a relay driver must be energized so that an armature is fired into contact (as completes a circuit) at the zero cross. As will be understood with reference to FIG. 6, this timing adjustment can occur periodically or for every command that is processed by the relay controller.

In addition to monitoring relay performance, each sensor 500 can detect one or more operating conditions the relay is exposed to. For example, the sensor can monitor a temperature of an environment surrounding a relay armature, and/or the relay armature itself. One of ordinary skill in the art will recognize that a surrounding temperature can affect a speed with which a operates. In one example, the relay controller can receive a temperature reading provided by the sensor in advance of a subsequent operation of the relay, and adjust a timing driver energization or de-energization to compensate for the current temperature and ensure that the relay is released or set on a zero cross.

Figure 6:
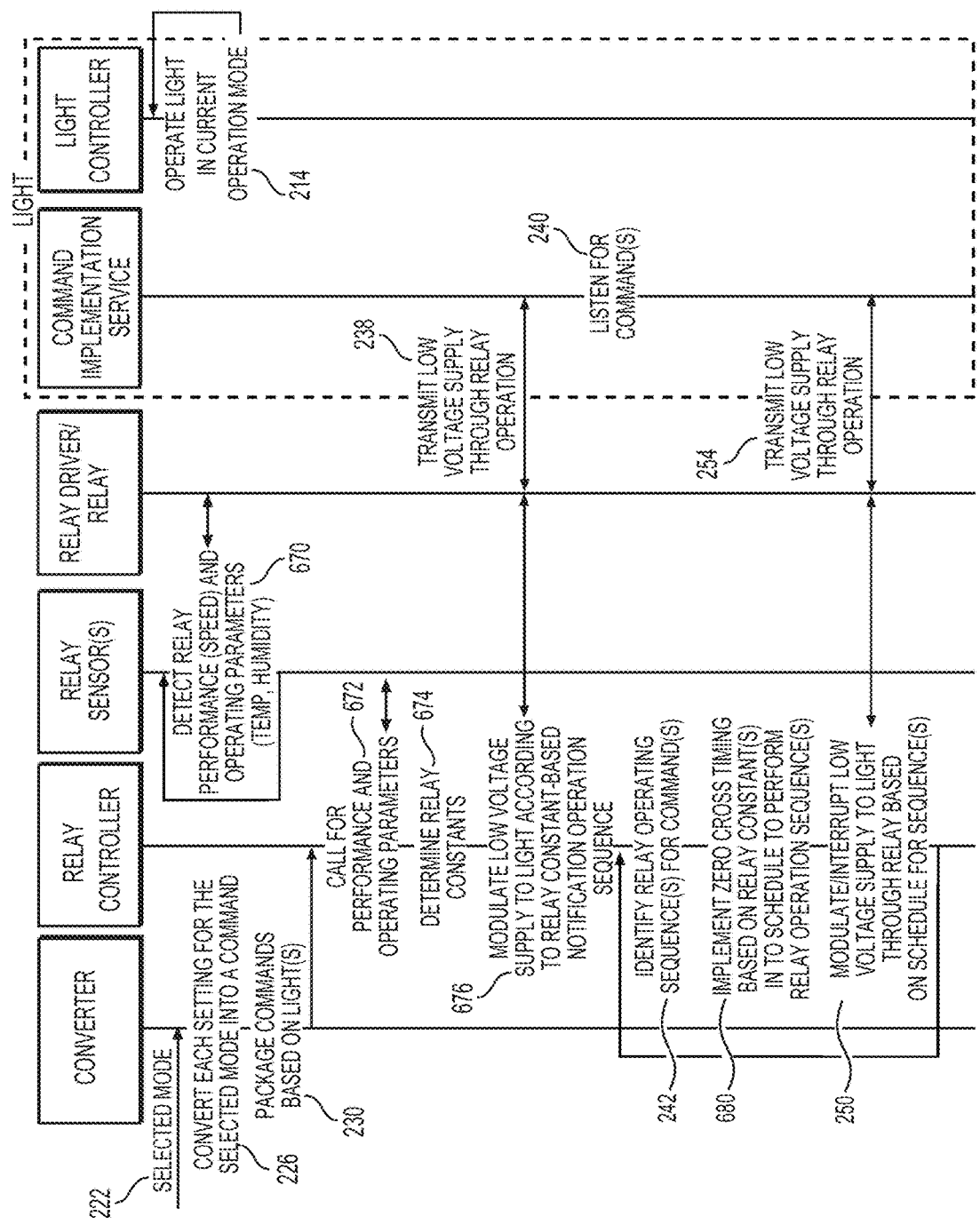
FIG. 6 is a sequence diagram of an example method for dynamically determining a relay armature timing for rapid operation mode changing and initiation.

FIG. 6 is a flowchart of an example method for dynamically determining a relay armature timing for rapid operation mode changing and initiation. The method of FIG. 6 is substantially similar to the method of FIG. 2. Stages shown in FIG. 6 that have the same numeral designation as stage shown in FIG. 2, include the same features and operations as their counterparts described above. However, the exemplary method of FIG. 6 differs from the method of FIG. 2 with the incorporation of a sensor, such as the sensors 500 described with reference to FIG. 5. In particular, at stage 670, the relay sensor continuously monitors or polls a relay with respect to at least one performance parameter that relates to a time required to perform setting and release operations of a relay armature. In another example, the sensor can additionally monitor operating conditions that exist a respective relay, such as temperature and humidity.

At stage 672, subsequent to receiving a package of commands pursuant to stage 230, a relay controller can communicate with, or access most recent data supplied by, the relay sensor. In one example, the relay sensor can continuously transmit data representing values of parameters the sensor monitors, such that the relay controller may only poll the sensor in stage 672 as a check to ensure the relay controller has the most recent readings.

In stage 674, the relay controller can determine relay constants based on the information received from the sensors. In on example, stage 674 can include the relay controller making the most recent setting and relay times detected by the sensor as the setting and release time relay constants. In another example, the relay controller can access a memory including a threshold number of readings for these two parameters to determine if the most recent readings are: (A) part of a trend of diminishing performance; (B) within a stand deviation of, and thus consistent with, operations over a certain period of time; (C) an anomaly and should be disregarded; or (D) indicative of a malfunctioning relay. A determination by the relay controller of which of the above categories the most recent readings apply to the most recent readings can dictate how the relay controller uses the most recent readings to adjust the relay constants. In turn, the adjusted relay constants will be used in stages 676 and 680 to determine timing for the zero cross operations within schedules for sequences of relay operations corresponding to commands included in the package of commands received in stage 230.

Thus, one advantage of the exemplary method of FIG. 6 is operation of the relay controller of the relay driver can be dynamic from one command to the next. More specifically how the relay controller operates the relay for one command can be based on the relay ability to perform the command, using zero cross timing, as indicated by the relay more recent performance(s) of other commands.

In another example, the stages 676 and 680 can be dynamic due to changes in operating conditions be taken into account. For example, with the sensor monitoring a temperature, for example within a housing including a DCS, relay constants can be adjusted to compensate for affects that this and other conditions (e.g., humidity) have on the operation of relays. In addition, readings for these operations conditions can inform hot to use previous time values as a means determining how to apply most recent detected amounts time for setting and releasing a relay.

For example, the relay controller can recognize a trend of a setting time for relay increasing for a sample of previous operations corresponding to a threshold number of most recent relay firings. However, in addition to referencing setting times, the relay controller may also look up temperatures detected by the sensor for the operations in the sample. Furthermore, the relay controller may be configured to recognize that the trend of longer setting times did not include, for example, a sub-group of operations within the sample where a detected temperature was within a certain range. Should a most recent detected temperature be within that range, the relay controller may determine how to use or not to use the most recent setting and release times detected by the sensor. For example, the relay controller could disregard the trend and maintain relay constants at current values; apply the current relay constants; use the setting times for the operations in the sub-group to determine a setting time for use in scheduling a next sequence of relays operations that implements zero cross timing.

Figure 7:
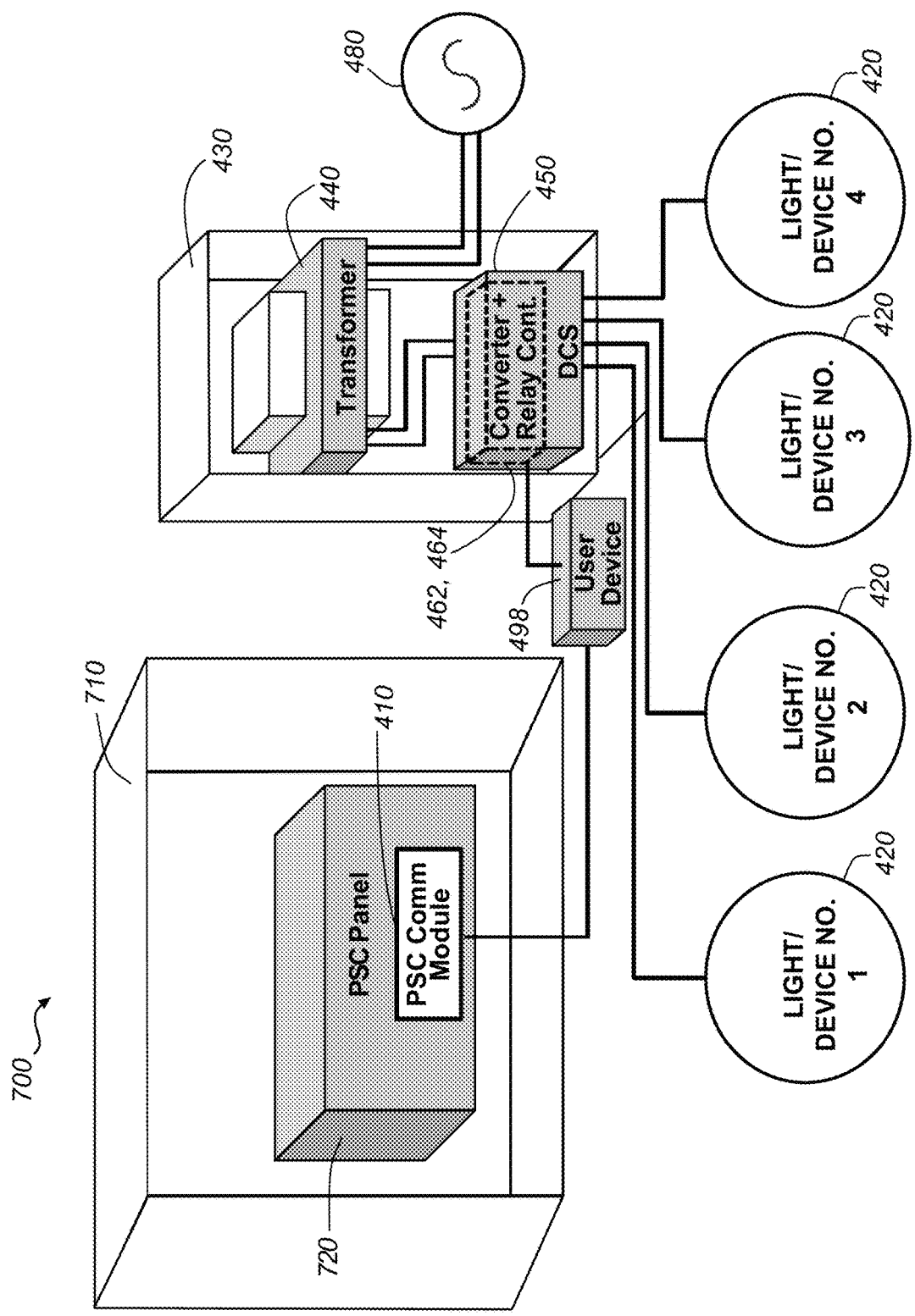
FIG. 7 illustrates an integrated system including a PSC panel, a user device, and a DCS according to aspects of the present disclosure.

FIG. 7 illustrates an integrated system 700 including a PSC panel 720, the user device 498, and the DCS 450 according to aspects of the present disclosure. In the integrated system 700, the converter 462 and the relay controller 464 are provided in the housing 430 with the DCS 450 and the transformer 440 as in FIGS. 4 and 5. As shown, the PSC panel 720 includes the second communication module 410 and is provided in a panel housing 710.

Figure 8:
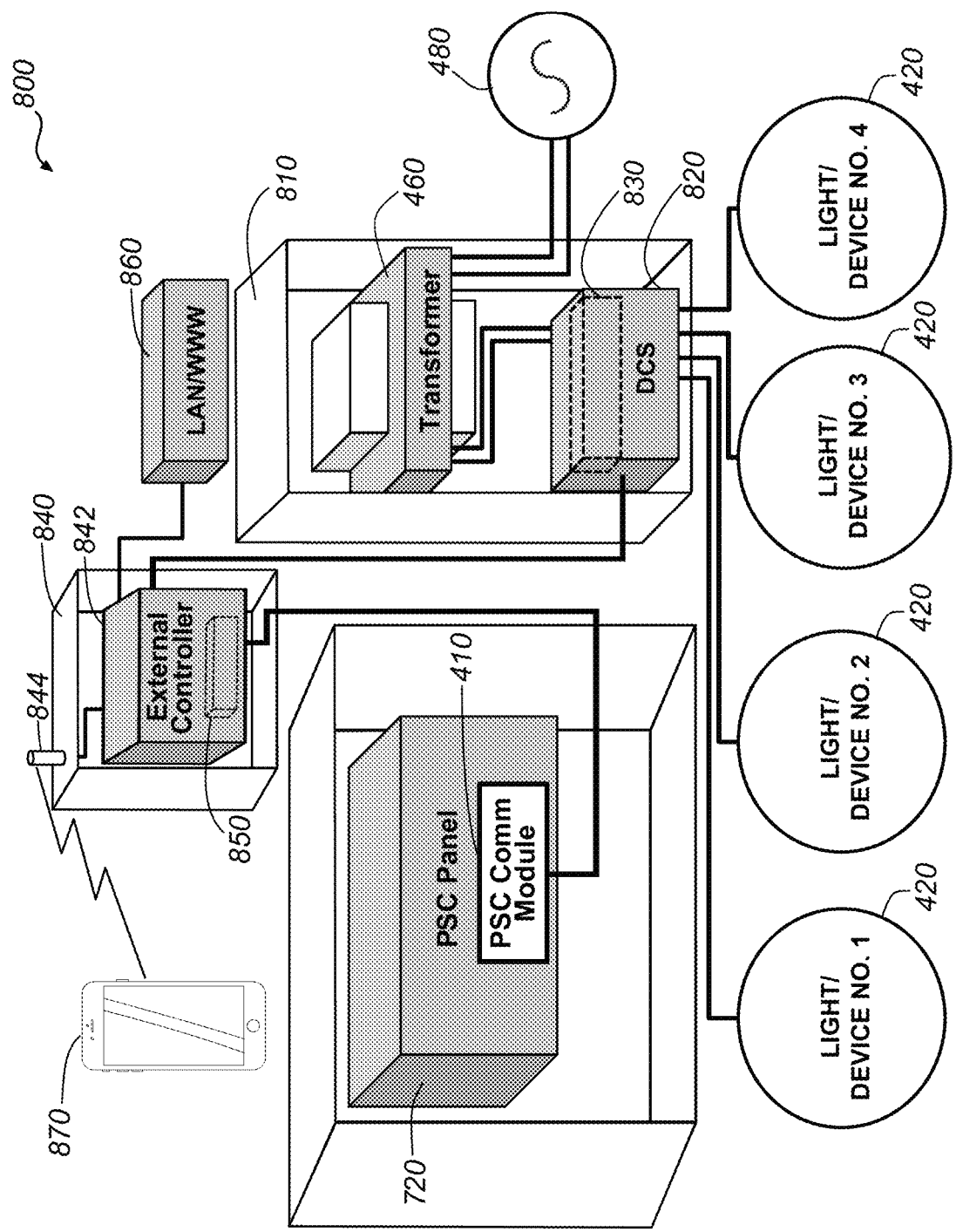
FIG. 8 illustrates an integrated system including a PSC panel, a user device, an external controller, and a DCS according to aspects of the present disclosure

FIG. 8 illustrates an integrated system 800 including the exemplary PSC panel 720, a DCS 820, an external control device 840 ("ECD 840"), a network connection 860, and a user device 870. In one example, an external controller 842 of the ECD 840 can integrate a converter 850 with a relay controller 830 provided with the DCS 830.

The external controller 842 of the ECD 840 is similar in many respects to external controllers described in the '342 patent. More specifically, the external controller 842 may direct, control, or select ON/OFF timing characteristics. Further, the external controller 842 can provide the input to the DCS 450 through, for example, a communication module, to adjust individual settings and light operation modes. Input from the external controller 842 can be based on user input received from the user device 870, for example, through a network connection 860 to a network. In addition, the external controller 842 can be connected to different types of networks, and thereby connected to different types of wired or wireless computing devices 870, via, for example, a cellular or WiFi connection facilitated by a cellular/WiFi connection device 844.

Furthermore, the external controller 842 can receive input from an external user interface (not shown), through which the light operation selection service is delivered, via one or more networks. Such user interfaces may be implemented wirelessly through one or more wireless enabled devices, such as, for example, a portable smartphone, electronic tablet, computer, or the like. Software that can be used from an external interface, can be installed on any device mentioned above, or pushed through a wireless network as an application or similar software to appear on the device to control and direct operations of the DCS 450. This can include the light operation selection service, although the light operation selection service is not limited to this manner of implementation. In other examples, the external controller 842 may be provided as a hard-wired or imbedded graphical user interface ("GUI"), provided at or in close proximity to the DCS 450, and enable the same or similar direction or control over the operation of the DCS 450 as described above.

As noted above, the external controller 842 is similar to external controllers described in the '342 patent. To the extent not stated herein, the external controller 842 may provide any and all functionality that is provided with the examples in the '342 patent. However, the external controllers of the '342 are not enabled to operate relays to communicate light operation modes as is the external controller 842 by way of its incorporation of the converter 850 according to the present disclosure. Thus, the converter 850 can expand, not only the DCS 450 applicability to different pool lighting systems, but also external controllers that often focus on providing users with control of these automation systems remotely.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for operating lights, the method comprising:
    stepping down a high voltage power supply, with a transformer, to a low voltage power supply and powering a light through a relay with the low voltage power supply;
    receiving a selection to operate the light in a selected mode, the selected mode specifying a setting for at least one operational feature of the light, the at least one operational feature being one of brightness, color, and a light operation scheme for the light;
    converting the selection into at least one command including components, the at least one command configured to cause the light to operate continuously while changing from a current mode of operation to the selected mode;
    determining an operation sequence for the relay to convey the at least one command to the light, a schedule for the operation sequence utilizing at least one zero cross operation of the relay to indicate at least one of the setting of the command and a change in operation mode; and
    operating the relay with the low voltage supply according to the relay operation sequence and the schedule.

2. The method of claim 1, further comprising:
    detecting, with a command implementation service, a signal of the low voltage power supply produced from the operating of the relay; and
    identifying, with the command implementation ser the components of the at least one command based on interruptions in a waveform of the signal.

3. The method of claim 2, further comprising:
    combining the components into the at least one command; and
    changing the current mode of operation of the light to the selected mode of operation according to the at least one command,
    wherein the light starts operating in the selected mode less than five seconds after ending operations in the current mode.

4. The method of claim 1, wherein the at least one command includes a plurality of commands, wherein each of the plurality of commands is associated with a respective operational feature of the light and defines a setting for the respective operational feature.

5. The method of claim 1, wherein determining the relay operation sequence for the relay includes:
    assigning a setting operation of the relay to a first component value;
    assigning a release operation of the relay to a second component value; and
    ordering a combination of setting and release operations according to component values of the components of the at least one command.

6. The method of claim 5, further comprising determining the schedule for the operation sequence based on a first relay constant for the setting operation and a second relay constant for the release operation of the relay, the first constant being different from the second constant, wherein the schedule provides at least one zero cross setting operation based on the first constant and at least one zero cross release operation based on the second constant.

7. The method of claim 6, further comprising: monitoring, with a sensor, a first timing for setting operations of a relay armature relative to energization operations of the relay driver; monitoring, with the sensor, a second timing of release operations of the relay armature relative to de-energization operations of the relay driver; updating the first relay constant based on the first timing and updating the second relay constant based on the second timing.

8. A non-transitory, computer-readable medium containing instructions that, when executed by a hardware-based processor, performs stages for operating lights, the stages comprising:
    stepping down a high voltage power supply, with a transformer, to a low voltage power supply and powering a light through a relay with the low voltage power supply;

receiving a selection to operate the light in a selected mode, the selected mode specifying a setting for at least one operational feature of the light, the at least one operational feature being one of brightness, color, and a light operation scheme for the light;

converting the selection into at least one command including components, the at least one command configured to cause the light to operate continuously while changing from a current mode of operation to the selected mode;

determining an operation sequence for the relay to convey the at least one command to the light, a schedule for the operation sequence utilizing at least one zero cross operation of the relay to indicate at least one of the setting of the command and a change in operation mode; and operating the relay with the low voltage supply according to the relay operation sequence and the schedule.

9. The non-transitory, computer-readable medium of claim 8, the stages further comprising:

detecting, with a command implementation service, a signal of the low voltage power supply produced from the operating of the relay; and identifying, with the command implementation ser the components of the at least one command based on interruptions in a waveform of the signal.

10. The non-transitory, computer-readable medium of claim 8, the stages further comprising:

combining the components into the at least one command; and changing the current mode of operation of the light to the selected mode of operation according to the at least one command, wherein the light starts operating in the selected mode less than five seconds after ending operations in the current mode.

11. The non-transitory, computer-readable medium of claim 8, wherein the at least one command includes a plurality of commands, wherein each of the plurality of commands is associated with a respective operational feature of the light and defines a setting for the respective operational feature.

12. The non-transitory, computer-readable medium of claim 8, wherein determining the relay operation sequence for the relay includes:

assigning a setting operation of the relay to a first component value;

assigning a release operation of the relay to a second component value; and ordering a combination of setting and release operations according to component values of the components of the at least one command.

13. The non-transitory, computer-readable medium of claim 12, the stages further comprising determining the schedule for the operation sequence based on a first relay constant for the setting operation and a second relay constant for the release operation of the relay, the first constant being different from the second constant, wherein the schedule provides at least one zero cross setting operation based on the first constant and at least one zero cross release operation based on the second constant.

14. The non-transitory, computer-readable medium of claim 13, the stages further comprising: monitoring, with a sensor, a first timing for setting operations of a relay armature relative to energization operations of the relay driver; monitoring, with the sensor, a second timing of release operations of the relay armature relative to de-energization operations of the relay driver; and updating the first relay constant based on the first timing and updating the second relay constant based on the second timing.

15. A system for operating lights, the system comprising:

a light;

a relay;

a transformer operatively coupled to the relay and configured to step down a high voltage power supply to a low voltage power supply, the transformer supplying the low voltage power supply to the light through the relay;

a memory storage including a non-transitory, computer-readable medium comprising instructions; and a computing device in communication with the relay and including a hardware-based processor that executes the instructions to carry out stages comprising:

receiving a selection to operate the light in a selected mode, the selected mode specifying a setting for at least one operational feature of the light, the at least one operational feature being one of brightness, color, and a light operation scheme for the light;

converting the selection into at least one command including components, the at least one command configured to cause the light to operate continuously while changing from a current mode of operation to the selected mode;

determining an operation sequence for the relay to convey the at least one command to the light, a schedule for the operation sequence utilizing at least one zero cross operation of the relay to indicate at least one of the setting of the command and a change in operation mode; and operating the relay with the low voltage supply according to the relay operation sequence and the schedule.

16. The system of claim 15, the stages further comprising:

detecting, with a command implementation service, a signal of the low voltage power supply produced from the operating of the relay; and identifying, with the command implementation ser the components of the at least one command based on interruptions in a waveform of the signal.

17. The system of claim 15, the stages further comprising:

combining the components into the at least one command; and changing the current mode of operation of the light to the selected mode of operation according to the at least one command, wherein the light starts operating in the selected mode less than five seconds after ending operations in the current mode.

18. The system of claim 15, wherein determining the relay operation sequence for the relay includes:

assigning a setting operation of the relay to a first component value;

assigning a release operation of the relay to a second component value; and ordering a combination of setting and release operations according to component values of the components of the at least one command.

19. The system of claim 18, the stages further comprising determining the schedule for the operation sequence based on a first relay constant for the setting operation and a second relay constant for the release operation of the relay, the first constant being different from the second constant, wherein the schedule provides at least one zero cross setting operation based on the first constant and at least one zero cross release operation based on the second constant.

20. The system of claim 19, the system further comprising a sensor that monitors operations of the relay, wherein the stages further comprise: monitoring, with the sensor, a first timing for setting operations of a relay armature relative to energization operations of the relay driver; monitoring, with the sensor, a second timing of release operations of the relay armature relative to de-energization operations of the relay driver; and updating the first relay constant based on the first timing and updating the second relay constant based on the second timing.

* * * * *